US012645780B2

(12) United States Patent
Kim

(10) Patent No.: US 12,645,780 B2
(45) Date of Patent: Jun. 2, 2026

(54) VEHICLE CONTROL DEVICE, SYSTEM, AND METHOD

(71) Applicants: HYUNDAI MOTOR COMPANY, Seoul (KR); KIA CORPORATION, Seoul (KR)

(72) Inventor: Dae Hyun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 53 days.

(21) Appl. No.: 18/656,917

(22) Filed: May 7, 2024

(65) Prior Publication Data

US 2025/0181695 A1 Jun. 5, 2025

(30) Foreign Application Priority Data

Dec. 5, 2023 (KR) ........................ 10-2023-0174552

(51) Int. Cl.
*G06F 21/00* (2013.01)
*G06F 21/33* (2013.01)
*G06F 21/44* (2013.01)

(52) U.S. Cl.
CPC .............. *G06F 21/33* (2013.01); *G06F 21/44* (2013.01)

(58) Field of Classification Search
CPC ................................. G06F 21/33; G06F 21/44
See application file for complete search history.

(56) References Cited

U.S. PATENT DOCUMENTS

| | | | |
|---|---|---|---|
| 10,668,875 B2 * | 6/2020 | Zoeller | ................ G05D 1/0011 |
| 11,182,485 B2 | 11/2021 | Cho | |
| 11,829,748 B1 | 11/2023 | Sharma | |
| 12,278,914 B1 * | 4/2025 | Camacho | .............. H04L 9/3268 |
| 2015/0200804 A1 | 7/2015 | Lee | |
| 2018/0082504 A1 * | 3/2018 | Park | .................... H04L 63/0892 |
| 2019/0034637 A1 | 1/2019 | Cho | |
| 2020/0389520 A1 * | 12/2020 | Mayer | ................. H04L 67/1008 |

(Continued)

FOREIGN PATENT DOCUMENTS

| | | |
|---|---|---|
| CN | 107272649 A | 10/2017 |
| CN | 112713999 B | 10/2021 |

(Continued)

*Primary Examiner* — Rodman Alexander Mahmoudi
(74) *Attorney, Agent, or Firm* — Lempia Summerfield Katz LLC

(57) ABSTRACT

A vehicle control device, a vehicle control system, and a vehicle control method are provided. The vehicle control device includes a processor and a memory for storing instructions. The processor receives a request for accessing a controller from an external electronic device configured to access the controller. The processor determines whether to perform verification for the external electronic device by means of the controller, using authentication information about the controller. Based on the determination to perform the verification, the processor requests an authentication certificate corresponding to the controller from the external electronic device, transmits the authentication certificate to the controller, and sets routing between the external electronic device and the controller, based on completion of verification for the authentication certificate, which is performed by the controller.

20 Claims, 10 Drawing Sheets

(56)         References Cited

U.S. PATENT DOCUMENTS

| | | | |
|---|---|---|---|
| 2022/0131748 A1* | 4/2022 | Smith | .................. H04L 41/0668 |
| 2023/0123408 A1 | 4/2023 | Sharma | |
| 2023/0188518 A1 | 6/2023 | Jung | |
| 2023/0385049 A1 | 11/2023 | Sharma | |

FOREIGN PATENT DOCUMENTS

| | | | |
|---|---|---|---|
| EP | 4160392 | A1 | 4/2023 |
| KR | 101060681 | B1 | 8/2011 |
| KR | 101600460 | B1 | 3/2016 |
| KR | 102368606 | B1 | 3/2022 |
| KR | 102389727 | B1 | 4/2022 |

* cited by examiner

101

VEHICLE CONTROL DEVICE, SYSTEM, AND METHOD

CROSS-REFERENCE TO RELATED APPLICATION

This application claims the benefit of and priority to Korean Patent Application No. 10-2023-0174552, filed in the Korean Intellectual Property Office on Dec. 5, 2023, the entire contents of which are incorporated herein by reference.

TECHNICAL FIELD

The present disclosure relates to a vehicle control device, a vehicle control system, and a vehicle control method. More particularly, the present disclosure relates to technologies to perform verification for an external electronic device using authentication information.

BACKGROUND

Various studies for identifying a state of a controller in a vehicle control system using a diagnostic have been in progress.

Particularly, the vehicle control system may check whether there is an authentication certificate in the diagnostic to access the controller using the diagnostic, which is an external electronic device and may grant access to a controller. The vehicle control system may determine hardware to perform verification for an authentication certificate, based on whether the controller follows an original equipment manufacturer (OEM) controller access policy. When the controller follows the OEM controller access policy, the vehicle control system may perform verification for the external electronic device using an OEM authentication certificate. However, when the controller does not follow the OEM controller access policy, this may cause a problem in which there is a need for a separate authentication certificate corresponding to the controller as well as the OEM authentication certificate.

SUMMARY

The present disclosure has been made to solve the above-mentioned problems occurring in the prior art while advantages achieved by the prior art are maintained intact.

Aspects of the present disclosure provide a vehicle control device for determining hardware to perform verification for a diagnostic, a vehicle control system, and a vehicle control method.

Other aspects of the present disclosure provide a vehicle control device for identifying whether a controller follows an OEM controller access policy, using authentication information corresponding to the controller, a vehicle control system, and a vehicle control method.

Another aspect of the present disclosure provides a vehicle control device for comprehensively managing an OFM authentication certificate for accessing a controller following an OEM controller access policy and a controller authentication certificate for accessing another controller, which does not follow the OEM controller access policy. Other aspects of the present disclosure also provide a vehicle control system and a vehicle control method that do the same.

The technical problems to be solved by the present disclosure are not limited to the aforementioned problems.

Any other technical problems not mentioned herein should be more clearly understood from the following description by those having ordinary skill in the art to which the present disclosure pertains.

According to an aspect of the present disclosure, a vehicle control device may include a processor and a memory configured to store instructions. In an embodiment, the processor is configured, by executing the instructions, to receive a request for accessing a controller from an external electronic device configured to access the controller through the vehicle control device. The processor is further configured to determine whether to perform verification for the external electronic device by means of the controller between the controller and the vehicle control device, using authentication information about the controller, based on the received request. Based on the determination to perform the verification for the external electronic device by means of the controller, the processor is further configured to: request a first authentication certificate corresponding to the controller from the external electronic device; transmit the first authentication certificate, received from the external electronic device, to the controller in response to requesting the first authentication certificate; and set routing between external electronic device and the controller, based on completion of verification for the first authentication certificate, the verification being performed by the controller.

In an embodiment, the processor is further configured, by executing the instructions, to receive a second authentication certificate distinct to the first authentication certificate, together with a request for changing the controller, from the external electronic device, before requesting the first authentication certificate corresponding to the controller from the external electronic device. The processor is further configured to perform verification for the received second authentication certificate. The processor is further configured to grant an access by the external electronic device, based on completion of the verification for the second authentication certificate.

In an embodiment, the processor is further configured, by executing the instructions, to set routing between the external electronic device and the controller, based on the completion of the verification for the second authentication certificate, without the verification for the first authentication certificate, based on another determination distinct to the determination to perform the verification for the external electronic device by means of the controller.

In an embodiment, the processor is further configured, by executing the instructions, to transmit a result of performing the verification for the second authentication certificate to the external electronic device.

In an embodiment, the vehicle control device may further include a communication circuit. The processor is further configured, by executing the instructions, to establish a communication link with the external electronic device in a wireless or wired manner through the communication circuit. The processor is further configured to receive the first authentication certificate or the second authentication certificate from the external electronic device through the communication link, based on the request indicating accessing the controller received from the external electronic device through the established communication link.

In an embodiment, the first authentication certificate may be exclusively set in the controller.

In an embodiment, the processor is further configured, by executing the instructions, to receive reprogramming information for changing the controller from the external electronic device, based on the set routing between the external electronic device and the controller.

In an embodiment, the authentication information may include information about an authentication certificate type classified according to whether to grant the external electronic device access authority over the controller using the controller.

According to another aspect of the present disclosure, a vehicle control system may include a controller, a gateway including authentication information indicating a type of a first authentication certificate for accessing the controller, and an external electronic device. The gateway may be configured to receive a request for accessing a controller at least partially connected to the gateway from the external electronic device. The gateway may be further configured to request a second authentication certificate distinct to the first authentication certificate and for accessing the gateway from the external electronic device, based on the received request. The gateway may be further configured to perform verification for the second authentication certificate received from the external electronic device. The gateway may be further configured to determine whether to perform verification for the external electronic device by means of the controller between the controller and a vehicle control device, using authentication information about the controller, based on completion of the verification for the second authentication certificate. The gateway may be further configured to request the first authentication certificate corresponding to the controller from the external electronic device, based on determination to perform the verification for the external electronic device by means of the controller. The gateway may be further configured to set routing between the external electronic device and the controller, based on completion of verification for the first authentication certificate, the verification being performed by the controller. The controller may be configured to perform the verification for the first authentication certificate received from the external electronic device and grant a change by the external electronic device, based on a result of verifying the first authentication certificate. The external electronic device may be configured to diagnose or change the controller by means of the gateway.

In an embodiment, the gateway may be further configured to perform the verification for the second authentication certificate and grant the external electronic device access to the controller, based on another determination distinct to the determination to perform the verification for the external electronic device by means of the controller.

In an embodiment, the controller may be further configured to determine whether to grant the external electronic device access authority over the controller, based on the performed verification for the first authentication certificate between the first authentication certificate and the second authentication certificate.

In an embodiment, the gateway may be further configured to receive reprogramming information for changing the controller, which performs the verification for the authentication certificate, from the external electronic device, based on the granted access to the controller, which performs the verification for the first authentication certificate.

In an embodiment, the external electronic device may be further configured to manage the first authentication certificate and the second authentication certificate, based on the first authentication certificate or the second authentication certificate obtained from an external server distinct to the external electronic device.

According to another aspect of the present disclosure, a vehicle control method may include receiving a request for accessing a controller from an external electronic device configured to access the controller through a vehicle control device. The vehicle control method may further include determining whether to perform verification for the external electronic device by means of the controller between the controller and the vehicle control device, using authentication information about the controller, based on the received request.

The vehicle control method may further include, based on determination to perform the verification for the external electronic device by means of the controller: requesting a first authentication certificate corresponding to the controller from the external electronic device; transmitting the first authentication certificate, received from the external electronic device, to the controller in response to requesting the first authentication certificate; and setting routing between the external electronic device and the controller, based on completion of verification for the first authentication certificate. The verification is performed by the controller.

In an embodiment, receiving the request for accessing the controller may include receiving a second authentication certificate distinct to the authentication certificate, together with a request for changing the controller, from the external electronic device, before requesting the first authentication certificate corresponding to the controller from the external electronic device. Receiving the request for accessing the controller may further include performing verification for the received second authentication certificate and granting access by the external electronic device, based on completion of the verification for the second authentication certificate.

In an embodiment, determining whether to perform the verification may include setting the routing between the external electronic device and the controller, based on completion of the verification for the second authentication certificate, without the verification for the first authentication certificate, based on another determination distinct to the determination to perform the verification for the external electronic device by means of the controller.

In an embodiment, performing the verification for the received second authentication certificate may include transmitting the result of performing the verification for the second authentication certificate to the external electronic device.

In an embodiment, receiving the request for accessing the controller may include establishing a communication link with the external electronic device in a wireless or wired manner through a communication circuit. Receiving the request for accessing the controller may further include receiving the first authentication certificate or the second authentication certificate from the external electronic device through the communication link, based on the request for accessing the controller received from the external electronic device through the established communication link.

In an embodiment, the first authentication certificate may be exclusively set in the controller.

In an embodiment, setting the routing between the external electronic device and the controller may include receiving reprogramming information for changing the controller from the external electronic device, based on the set routing between the external electronic device and the controller.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
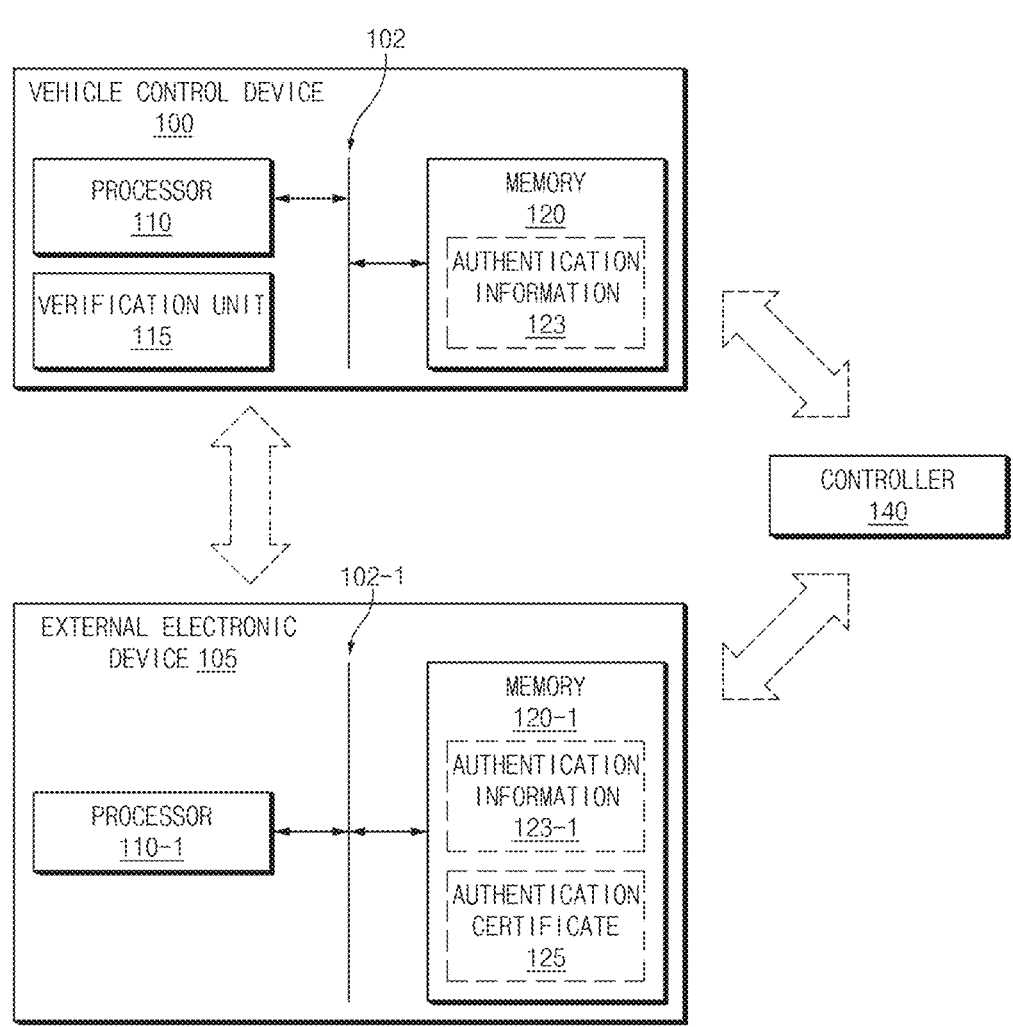
FIG. 1 illustrates an example of a block diagram of a vehicle control system according to an embodiment of the present disclosure.

Hereinafter, some embodiments of the present disclosure are described in detail with reference to the drawings. In adding the reference numerals to the components of each drawing, it should be noted that the identical or equivalent components are designated by the identical numerals even when the components are displayed on other drawings. In addition, a detailed description of well-known features or functions has been omitted in order not to unnecessarily obscure the gist of the present disclosure.

In describing components of embodiments of the present disclosure, the terms first, second, A, B, (a), (b), and the like may be used herein. These terms are only used to distinguish one component from another component and do not limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings consistent with the contextual meanings in the relevant field of art. Such terms should not be interpreted as having ideal or excessively formal meanings unless clearly defined as having such meanings in the present disclosure.

The term "module" used in various embodiments of the present disclosure may include a unit implemented with hardware, software, or firmware and may be interchangeably used with terms, for example, "logic," "logic block," "part," or "circuitry". A module may be an integral part or a minimum unit or portion thereof, configured to perform one or more functions. In an embodiment, the module may be implemented in the form of an application-specific integrated circuit (ASIC). According to various embodiments, operations performed by the module, the program, or another component may be carried out sequentially, in parallel, or repeatedly. Alternatively, one or more of the operations may be executed in a different order or omitted. Alternatively, one or more other operations may be added.

Various embodiments of the present disclosure may be implemented as software (e.g., a program) including one or more instructions stored in a storage medium (e.g., an internal memory or an external memory) readable by a machine (e.g., a vehicle control device 100). For example, a processor (e.g., a processor 110) of the device (e.g., the vehicle control device 100) may invoke at least one of the stored one or more instructions from the storage medium and may execute the at least one of the stored one or more instructions. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave). However, this term does not differentiate between where data is semi-permanently stored in the storage medium and where data is temporarily stored in the storage medium. When a controller, module, component, device, element, or the like of the present disclosure is described as having a purpose or performing an operation, function, or the like, the controller, module, component, device, element, or the like should be considered herein as being "configured to" meet that purpose or to perform that operation or function. Each controller, module, component, device, element, and the like may separately embody or be included with a processor and a memory, such as a non-transitory computer readable media, as part of the apparatus.

Hereinafter, embodiments of the present disclosure are described in detail with reference to FIGS. 1-10.

FIG. 1 illustrates an example of a block diagram of a vehicle control system according to an embodiment of the present disclosure. Referring to FIG. 1, a vehicle control system 101 according to an embodiment of the present disclosure may include a vehicle control device 100, a controller 140, and/or an external electronic device 105. The vehicle control device 100 according to an embodiment of the present disclosure may establish a connection with the external electronic device 105 and/or the controller 140 based on a wired network and/or a wireless network. For example, the wired network may include a network, such as the Internet, a local area network (LAN), a wide area network (WAN), an Ethernet for vehicle, a controller area network (CAN), a local interconnect network (LIN), FlexRay, or any combination thereof. For example, the wireless network may include a network, such as long term evolution (LTE), 5th generation new radio (5G NR), wireless fidelity (Wi-Fi), ZigBee, near field communication (NFC), Bluetooth, Bluetooth low-energy (BLE), or any combination thereof. Although it is shown that the vehicle control device 100, the external electronic device 105, and/or the controller 140 are directly connected to each other, the vehicle control device 100 and the external electronic device 105 may be indirectly connected to each other through an intermediate node in a network (or an update management server 710 of FIG. 7). The vehicle control system 101 according to an embodiment may include a plurality of controllers (e.g., a first controller 141 of FIG. 2 and a second controller 142 of FIG. 2). The vehicle control device 100 may establish a communication link for transmitting data between the plurality of controllers. The vehicle control device 100 may be referred to as a gateway in terms of being configured to establish a communication link between the plurality of controllers or manage the plurality of controllers.

The vehicle control device 100 according to an embodiment of the present disclosure may be implemented inside or outside a vehicle, and some of components included in the vehicle control device 100 may be implemented inside or outside the vehicle. In this case, the vehicle control device 100 may be integrally configured with control units (e.g., the controller 140) in the vehicle or may be implemented as a separate device to be connected to the control units of the vehicle by a separate connection means. Types of the pieces of hardware included in the vehicle control device 100 and/or the number of the pieces of hardware are limited to those shown in FIG. 1. For example, the vehicle control device 100 may include only some of the pieces of hardware shown in FIG. 1. As an example, the vehicle control device 100 may further include a communication circuit (or an interface) for establishing a communication link with the external electronic device 105 in a wired or wireless manner. The vehicle control device 100 may receive a request for accessing the controller 140 (or an authentication certificate required to access the controller 140) from the external electronic device 105, based communication link established with the external on the electronic device 105 in a wired or wireless manner through the communication circuit.

The vehicle control device 100 according to an embodiment may include at least one of a processor 110, a memory 120, or a verification unit 115. The processor 110, the memory 120, and the verification unit 115 may be electronically or operably coupled with each other by an electronical component, such as a communication bus 102. Hereinafter, that pieces of hardware are operably coupled with each other may mean that a direct connection or an indirect connection between the pieces of hardware is established in a wired or wireless manner, such that second hardware is controlled by first hardware among the pieces of hardware. The pieces of hardware are illustrated based on the different blocks, but an embodiment is not limited thereto. Some (e.g., the processor 110, the memory 120, and the communication circuit) of the pieces of hardware of FIG. 1 may be included in a single integrated circuit such as a system on a chip (SoC).

The processor 110 of the vehicle control device 100 according to an embodiment may include hardware for processing data based on one or more instructions. The hardware for processing the data may include, for example, an arithmetic and logic unit (ALU), a floating point unit (FPU), a field programmable gate array (FPGA), a central processing unit (CPU), and/or an application processor (AP). The number of the processors 110 may be one or more in number. For example, the processor 110 may have a structure of a multi-core processor such as a dual core, a quad core, or a hexa core. Operations below may be performed by the processor 110.

According to an embodiment, the memory 120 of the vehicle control device 100 may include a hardware component for storing data and/or an instruction input and/or output from the processor 110. The memory 120 may include, for example, a volatile memory, such as a random-access memory (RAM), and/or a non-volatile memory, such as a read-only memory (ROM). The volatile memory may include at least one of, for example, a dynamic RAM (DRAM), a static RAM (SRAM), a cache RAM, or a pseudo SRAM (PSRAM). The non-volatile memory may include at least one of, for example, a programmable ROM (PROM), an erasable PROM (EPROM), an electrically erasable PROM (EEPROM), a flash memory, a hard disk, a compact disc, a solid state drive (SSD), or an embedded multi-media card (eMMC).

One or more instructions indicating calculation and/or an operation to be performed for data by the processor 110 may be stored in the memory 120 of the vehicle control device 100 according to an embodiment. A set of the one or more instructions may be referred to as firmware, an operating system, a process, a routine, a sub-routine, and/or an application. For example, when a set of a plurality of instructions distributed in the form of an operating system, firmware, a driver, and/or an application is executed, the vehicle control device 100 and/or the processor 110 may perform at least one of operations of FIGS. 8 and 9. Hereinafter, that software in the form of an operating system, firmware, a driver, and/or an application is installed in the vehicle control device 100 may mean that one or more instructions provided in the form of software are stored in the memory 120 of the vehicle control device 100. Specifically, one or more applications are stored in a format executable by the processor 110 of the vehicle control device 100 (e.g., as a file with an extension specified by an operating system of the vehicle control device 100).

The memory 120 of the vehicle control device 100 according to an embodiment may include authentication information 123. In an embodiment, the authentication information 123 may include information associated with the controller 140, which is at least temporarily connected to the vehicle control device 100. For example, the authentication information 123 may include information indicating whether to grant the external electronic device 105 access authority over the controller 140. As an example, the authentication information 123 may include information indicating a type of an authentication certificate required to access the controller 140. For example, the type of the authentication certificate may be divided according to an authentication level like Table 1 below.

TABLE 1

| Controller | Authentication level | Type of authentication certificate |
|---|---|---|
| First controller | Level 2 | Authentication certificate (e.g., #1 authentication certificate) |
| Second controller | Level 1 | Another authentication certificate (e.g., original equipment manufacturer (OEM) authentication certificate, which may be a #2 authentication certificate) |

Referring to Table 1 above, for example, the authentication level may be classified based on a type of an authentication certificate required according to a type of a controller, which may not be classified according to a security degree for accessing the controller. As an example, the authentication level may be classified according to the number of authentication certificates required to access the controller. However, it is not limited thereto.

Referring to Table 1 above, for example, the type of the authentication certificate may be classified as an authentication certificate (e.g., #1 authentication certificate) exclusively set in one controller and/or another authentication certificate (e.g., an OEM authentication certificate) available in common in controllers (e.g., a second controller) corresponding to level 1. For example, the authentication certificate exclusively set in the one controller may be verified by the one controller between the vehicle control device 100 and the one controller. For example, the other authentication certificate may be verified by the vehicle control device 100 in terms of being available in common in the controllers corresponding to level 1. Herein it is not limited thereto.

In an embodiment, the authentication certificate (e.g., #1 authentication certificate) may have a format for a controller, which does not follow an OEM controller access policy. For example, the controller, which does not follow the OEM controller access policy, may be referred to as an "off the shelf" controller in terms of not following the OEM controller access policy and using an authentication certificate distributed (or released) from a supplier, which manufactures the controller. The authentication certificate (e.g., #1 authentication certificate) exclusively set in the one controller may be referred to as a) "supplier authentication certificate" in terms of being exclusively set in the one controller and being distributed from the supplier.

The vehicle control device 100 according to an embodiment may request an authentication certificate corresponding to the controller 140 from the external electronic device 105 for accessing the controller 140, based on the authentication certificate (or a type of the authentication certificate) corresponding to the controller 140, using the authentication information 123. Referring to Table 1 described above, the vehicle control device 100 according to an embodiment may request another authentication certificate corresponding to the second controller, which correspond to level 1 from the external electronic device 105. The vehicle control device 100 according to an embodiment may perform verification for the other authentication certificate received from the external electronic device 105 by means of the verification unit 115. The vehicle control device 100 according to an embodiment may grant the external electronic device 105 access to the vehicle control device 100, based on the completion of the verification for the other authentication certificate. The vehicle control device 100 may include the external electronic device 105 granted access to the vehicle control device 100 and the second controller and may set routing between one or more controllers divided into level 1. The external electronic device 105 may diagnose, change (e.g., reprogram), or update the one or more controllers, based on the routing set with the one or more controllers. The operation in which the external electronic device 105 diagnoses the one or more controllers may include an operation of identifying states of the one or more controllers. Herein it is not limited thereto.

Referring to Table 1 described above, the vehicle control device 100 according to an embodiment may request an authentication certificate corresponding to a first controller and may request another authentication certificate for accessing the vehicle control device 100 from the external electronic device 105 for accessing the first controller corresponding to level 2. For example, after verifying the other authentication certificate, the vehicle control device 100 may request the authentication certificate corresponding to the first controller from the external electronic device 105. The vehicle control device 100 may receive the authentication certificate from the external electronic device 105 in response to requesting the authentication certificate corresponding to the first controller. The vehicle control device 100 may transmit the received authentication certificate to the first controller. The vehicle control device 100 may set routing between the external electronic device 105 and the first controller, based on the completion of the verification, which is performed by the first controller, for the authentication certificate. In other words, the vehicle control device 100 may grant the external electronic device 105 a CAN identification (ID) for the first controller. The external electronic device 105 in which the routing is set with the first controller may diagnose or change (e.g., reprogram) the first controller.

The vehicle control device 100 according to an embodiment may include the verification unit 115. The vehicle control device 100 may verify the authentication certificate (e.g., the OEM authentication certificate) received from the external electronic device 105, using the verification unit 115. The operation in which the vehicle control device 100 verifies the authentication certificate may include an operation of identifying effectiveness and/or integrity for the authentication certificate. For example, the vehicle control device 100 may perform verification for the authentication certificate (e.g., the OEM authentication certificate) using the verification unit 115 to determine whether the external electronic device 105 is able to access the vehicle control device 100. For example, the authentication certificate may include role and authority information of an authentication certificate owner. The authentication certificate may include an encrypted electronic signature and/or a validity period.

The vehicle control device 100 according to an embodiment may decrypt the encrypted electronic signature in the authentication certificate received from the external electronic device 105 and may determine the effectiveness of the electronic signature, using the verification unit 115.

The vehicle control device 100 according to an embodiment may compare authentication certificate expiration date information included in the authentication certificate received from the external electronic device 105 with current date information to identify whether the validity period of the authentication certificate expires. When the validity period of the authentication certificate expires, the vehicle control device 100 may block the access of the external electronic device 105 to the vehicle control device 100. As an example, the vehicle control device 100 may request the external electronic device 105 to transmit an authentication certificate, a validity period of which does not expire. In this case, the external electronic device 105 may obtain the authentication certificate, the validity period of which does not expire, from an authentication certificate generation server and may provide the vehicle control device 100 with the obtained authentication certificate. For example, the verification unit 115 may be referred to as a verification module or a verifier.

In an embodiment, the controller 140 may drive at least a part of the vehicle including the vehicle control device 100 according to an embodiment. For example, the controller 140 may be referred to as an electronic control unit in terms of managing electronic devices in the vehicle. The electronic control unit may include an engine control unit, a transmission control unit (TCU), and/or electronic stability control (ESC), depending on a type of an electronic device controllable by the electronic control unit. The controller 140 according to an embodiment may determine whether to grant the external electronic device 105 to access authority over the controller 140, based on the performed verification for the authentication certificate, which corresponds to the controller 140 and is exclusively set in the controller 140. The controller 140 may be referred to as a domain controller in terms of controlling the electronic device in the vehicle. For example, the vehicle control system 101 may include a plurality of controllers.

In an embodiment, the external electronic device 105 may include at least one of a processor 110-1 or a memory 120-1. The processor 110-1 and the memory 120-1 may be electronically or operably coupled with each other by an electronical component, such as a communication bus 102-1. Types of the pieces of hardware included in the external electronic device 105 and/or the number of the pieces of hardware are/is not limited to those shown in FIG. 1. For example, the external electronic device 105 may include only some of the pieces of hardware shown in FIG. 1. The processor 110-1 and the memory 120-1 included in the external electronic device 105 may include a hardware part and/or a circuit corresponding to the processor 110 and the memory 120 of the vehicle control device 100. Hereinafter, to reduce the repetition, the description of hardware and/or software included in the external electronic device 105 may be omitted when the hardware and/or the software are/is duplicated with the vehicle control device 100.

In an embodiment, the external electronic device 105 may include an authentication certificate 125. As described above using Table 1 above, the authentication certificate 125 may include an authentication certificate (e.g., #1 authentication certificate) and/or another authentication certificate (e.g., an OEM authentication certificate) available in common in controllers (e.g., the second controller) corresponding to level 1. For example, when there is no authentication certificate corresponding to a controller to be diagnosed (or accessed), the external electronic device 105 may obtain the authentication certificate 125 from an external server. For example, when requesting the vehicle control device 100 to access a controller, the external electronic device 105 may identify the authentication certificate 125 corresponding to the controller using authentication information 123-1 and may transmit the authentication certificate 125 to the vehicle control device 100. For example, the external electronic device 105 may further include, but is not limited to, an authentication certificate management device capable of managing the authentication certificate 125.

For example, the authentication information 123-1 may include the same information as the authentication information 123 included in the vehicle control device 100. However, it is not limited thereto.

In an embodiment, the external electronic device 105 may be referred to as a "diagnostic" in terms of accessing the vehicle control device 100 and performing a diagnosis of the controller 140. For example, the external electronic device 105 may be referred to as an authentication certificate management server (e.g., an authentication certificate management server 705 of FIG. 7) in terms of obtaining an authentication certificate from an external server (e.g., an authentication certificate generation server) and managing the authentication certificate.

As described above, the vehicle control system 101 according to an embodiment of the present disclosure may manage the authentication certificate according to the type of the controller divided based on whether to follow the OEM controller access policy. Thus, a verification procedure for the external electronic device 105 for accessing the controller may be simplified.

Figure 2:
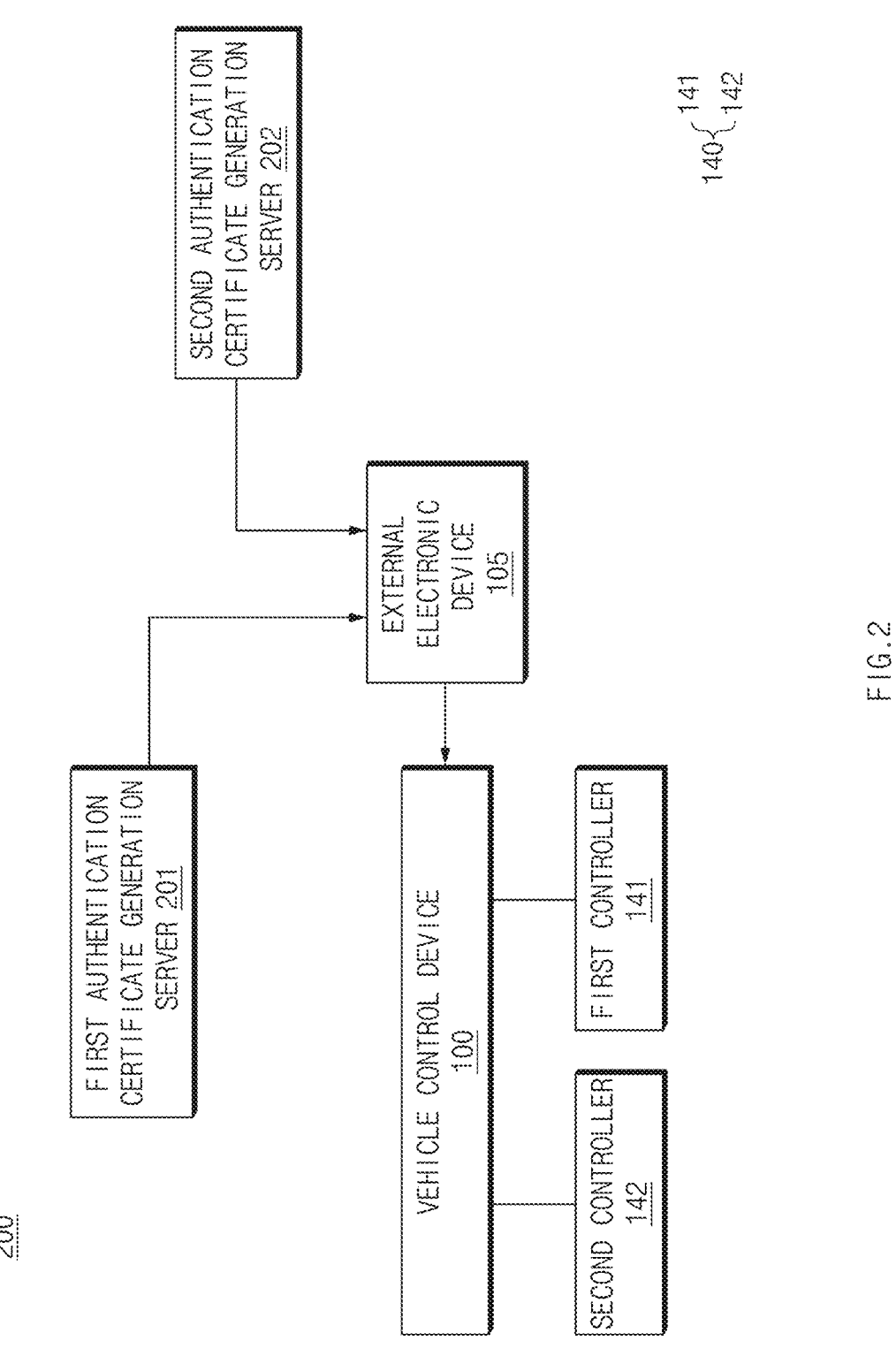
FIG. 2 illustrates an example of performing a connection with an external electronic device in a vehicle control device according to an embodiment of the present disclosure.

FIG. 2 illustrates an example of performing a connection with an external electronic device in a vehicle control device according to an embodiment of the present disclosure. Referring to FIG. 2, in an embodiment, a state 200, in which a vehicle control device 100 obtains an authentication certificate using an authentication certificate generation server (e.g., a first authentication certificate generation server 201 and/or a second authentication certificate generation server 202), for verifying an external electronic device 105 is illustrated. For example, the state 200 may include a vehicle control system (e.g., a vehicle control system 101 of FIG. 1). The vehicle control system may include a controller 140, a vehicle control device 100 including authentication information (e.g., authentication information 123 of FIG. 1) indicating a type of an authentication certificate corresponding to the controller 140 and for accessing the controller 140, and/or an external electronic device 105.

The vehicle control device 100 according to an embodiment of the present disclosure may identify the external electronic device 105 for accessing at least one (e.g., a first controller 141 or a second controller 142) of a plurality of controllers (e.g., the controller 140), which are at least temporarily connected to the vehicle control device 100. The vehicle control device 100 according to an embodiment may receive a request indicating accessing at least one of the plurality of controllers from the external electronic device 105. The vehicle control device 100 according to an embodiment may determine whether to perform verification for the external electronic device 105 by means of at least one of the at least one of the plurality of controllers or the vehicle control device 100, using authentication information (e.g., authentication information 123 of FIG. 1) about the at least one of the plurality of controllers, based on the received request.

For example, when receiving a request for accessing the first controller 141 (e.g., a first controller corresponding to level 2 of Table 1 above) from the external electronic device 105, the vehicle control device 100 may request an authentication certificate exclusively set in the first controller 141 from the external electronic device 105.

For example, when receiving a request for accessing the second controller 142 (e.g., a second controller corresponding to level 1 of Table 1 above) from the external electronic device 105, the vehicle control device 100 may request another authentication certificate distinct to the authentication certificate exclusively set in the first controller 141 from the external electronic device 105. The other authentication certificate may include an OEM authentication certificate.

In an embodiment, the external electronic device 105 may obtain an authentication certificate for accessing the vehicle control device 100 (or the controller 140) from an authentication certificate generation server (e.g., a first authentication certificate generation server 201 and/or a second authentication certificate generation server 202).

For example, the first authentication certificate generation server 201 may distribute an authentication certificate (e.g., an OEM authentication certificate) for accessing the vehicle control device 100. For example, the second authentication certificate generation server 202 may distribute (or provide) an authentication certificate corresponding to the first controller 141. The second authentication certificate generation server 202 may be provided by a supplier which supplies the first controller 141. The second authentication certificate generation server 202 may be referred to as a "supplier authentication certificate generation server" in terms of distributing the authentication certificate corresponding to the first controller 141.

Hereinafter, a description is given in detail of an operation in which the vehicle control system according to an embodiment of the present disclosure determines hardware (e.g., the vehicle control device 100 or the controller 140) to perform verification for the external electronic device 105, based on a type of a controller to be diagnosed using the external electronic device 105 with reference to FIGS. 3-6.

Figure 3:
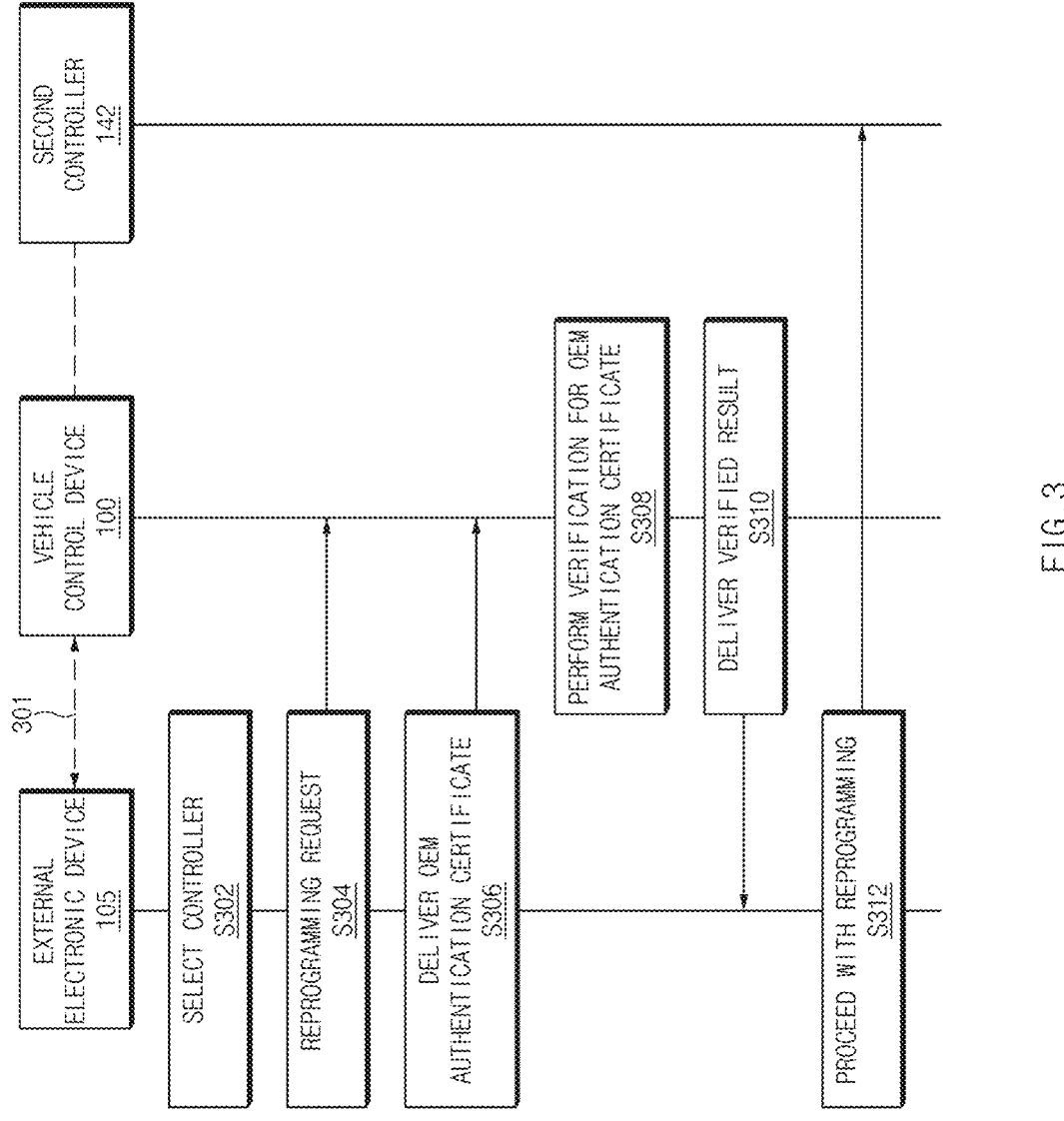
FIG. 3 illustrates an example of a signal sequence diagram about a vehicle control system according to an embodiment of the present disclosure.
Figure 4:
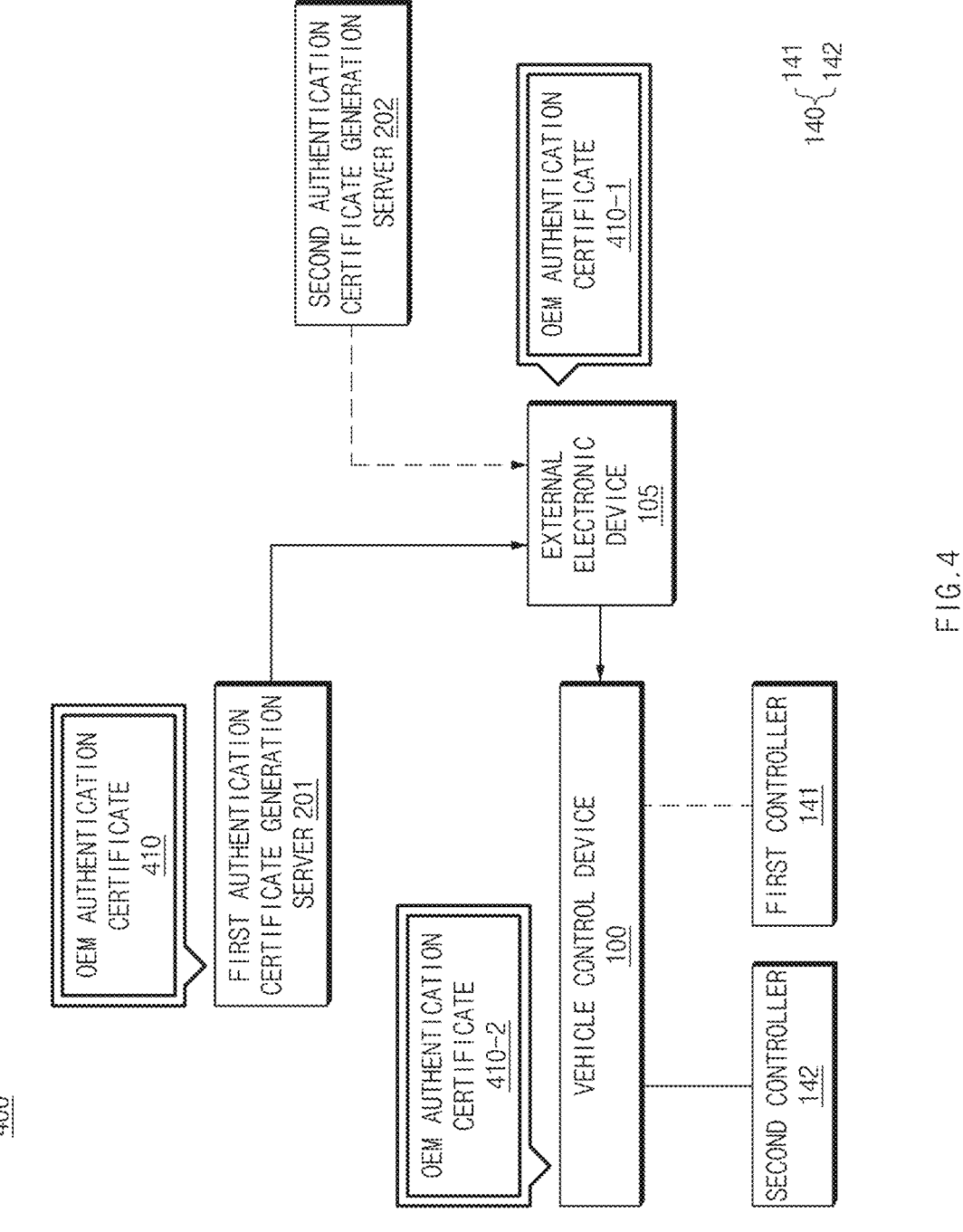
FIG. 4 illustrates an example of performing verification for an external electronic device in a vehicle control device according to an embodiment of the present disclosure.

FIG. 3 illustrates an example of a signal sequence diagram about a vehicle control system according to an embodiment of the present disclosure. FIG. 4 illustrates an example of performing verification for an external electronic device in a vehicle control device according to an embodiment of the present disclosure. Referring to FIG. 3, a vehicle control device 100 according to an embodiment of the present disclosure may establish a communication link 301 with an external electronic device 105 in a wired or wireless manner. For example, the vehicle control device 100 may identify an on-board diagnostics (OBD) connector through an interface and thus establish the communication link 301 with the external electronic device 105. Herein it is not limited thereto.

Referring to FIG. 3, in S302, in an embodiment, the external electronic device 105 may select (or receive an input indicating the selection of) a second controller 142 among a plurality of controllers in a vehicle control system (e.g., a vehicle control system 101 of FIG. 1). Referring to Table 1 described above, the second controller 142 may correspond to level 1. Because the second controller 142 corresponds to level 1, when the vehicle control device 100 verifies the external electronic device 105 using an OEM authentication certificate, the vehicle control device 100 may grant the external electronic device 105 access to the second controller 142, without an authentication certificate exclusively set in the second controller 142.

Referring to FIG. 3, in an embodiment, in S304, the external electronic device 105 may transmit a request for reprogramming the selected second controller 142 to the vehicle control device 100. The request for reprogramming the second controller 142 may include a request indicating accessing (or diagnosing) the second controller 142.

The vehicle control device 100 according to an embodiment may determine whether to perform verification for the external electronic device 105 by means of the second controller 142 between the second controller 142 and the vehicle control device information (e.g., authentication 100, using authentication information 123 of FIG. 1) about the second controller 142, based on the received request. For example, the vehicle control device 100 may request an authentication certificate (e.g., an OEM authentication certificate) for accessing the vehicle control device 100 from the external electronic device 105, based on another determination distinct to the determination to perform the verification for the external electronic device 105 by means of the second controller 142 but not limited thereto. For example, because of including authentication information, the external electronic device 105 may perform S306 without the reception of a signal for requesting an authentication certificate from the vehicle control device 100. Referring to FIG. 3, in S306, in an embodiment, the external electronic device 105 may deliver (or transmit) the OEM authentication certificate to the vehicle control device 100.

Referring to FIG. 4, an example of a state 400 in which the vehicle control system (e.g., the vehicle control system 101 of FIG. 1) according to an embodiment obtains an authentication certificate from an external server is illustrated. In the state 400, in an embodiment, the external electronic device 105 may obtain (or download) an OEM authentication certificate 410 from a first authentication certificate generation server 201 to access the vehicle control device 100. For example, the external electronic device 105 may store the obtained OEM authentication certificate 401-1 in its memory. The OEM authentication certificate 410-1 may include substantially the same information as the OEM authentication certificate 410 generated (or distributed) from the first authentication certificate generation server 201.

Referring to FIG. 4, after receiving the request for accessing the second controller 142 from the external electronic device 105, the vehicle control device 100 according to an embodiment may receive an OEM authentication certificate 410-2 from the external electronic device 105. The OEM authentication certificate 410-2 may include substantially the same information as the OEM authentication certificate 410 and/or the OEM authentication certificate 410-1.

Referring again to FIG. 3, in S308, the vehicle control device 100 according to an embodiment may perform verification for the OEM authentication certificate 410-2 received from the external electronic device 105.

Referring to FIG. 3, in S310, the vehicle control device 100 according to an embodiment may transmit the result of the verification for the OEM authentication certificate to the external electronic device 105. The vehicle control device 100 according to an embodiment may set routing between the external electronic device 105 and the second controller 142, based on the completion (or success) of the verification for the OEM authentication certificate.

For example, because the second controller 142 is set to follow an OEM controller authentication policy, the vehicle control device 100 may set the routing between the external electronic device 105 and the second controller 142 without verifying an authentication certificate provided from a supplier, which manufactures the second controller 142. For example, the vehicle control device 100 may provide the external electronic device 105 with a CAN ID for accessing the second controller 142.

The vehicle control device 100 according to an embodiment may transmit a message indicating failure to the external electronic device 105, based on the failure of the verification for the OEM authentication certificate. As an example, when the validity period of the authentication certificate expires, the vehicle control device 100 may transmit a message indicating the failure of the verification for the authentication certificate to the external electronic device 105. In this case, the external electronic device 105 may request the first authentication certificate generation server 201 to update the validity period of the authentication certificate, the validity period of which expires. However, it is not limited to the above-mentioned embodiment.

Referring to FIG. 3, in an embodiment, in S312, the external electronic device 105 may proceed with (or perform) reprogramming of the second controller 142, based on the completion of the verification in the vehicle control device 100.

For example, the vehicle control device 100 may receive reprogramming information from the external electronic device 105. The vehicle control device 100 may deliver the received reprogramming information to the second controller 142 and thus may cause the second controller 142 to reprogram the second controller 142.

As described above, the vehicle control system (e.g., the vehicle control system 101 of FIG. 1) according to an embodiment may manage one or more controllers (e.g., the second controller 142) set to follow the OEM controller access policy in common, using one authentication certificate (e.g., the OEM authentication certificate 410). The vehicle control system according to an embodiment may determine whether to grant access to the external electronic device 105, by means of at least one of the vehicle control device or a controller to be diagnosed using authentication information corresponding to the controller to be diagnosed.

Hereinafter, a description is given in detail of an operation in which the vehicle control device grants access to the external electronic device by means of a controller set not to follow the OEM controller access policy with reference to FIGS. 5 and 6.

Figure 5:
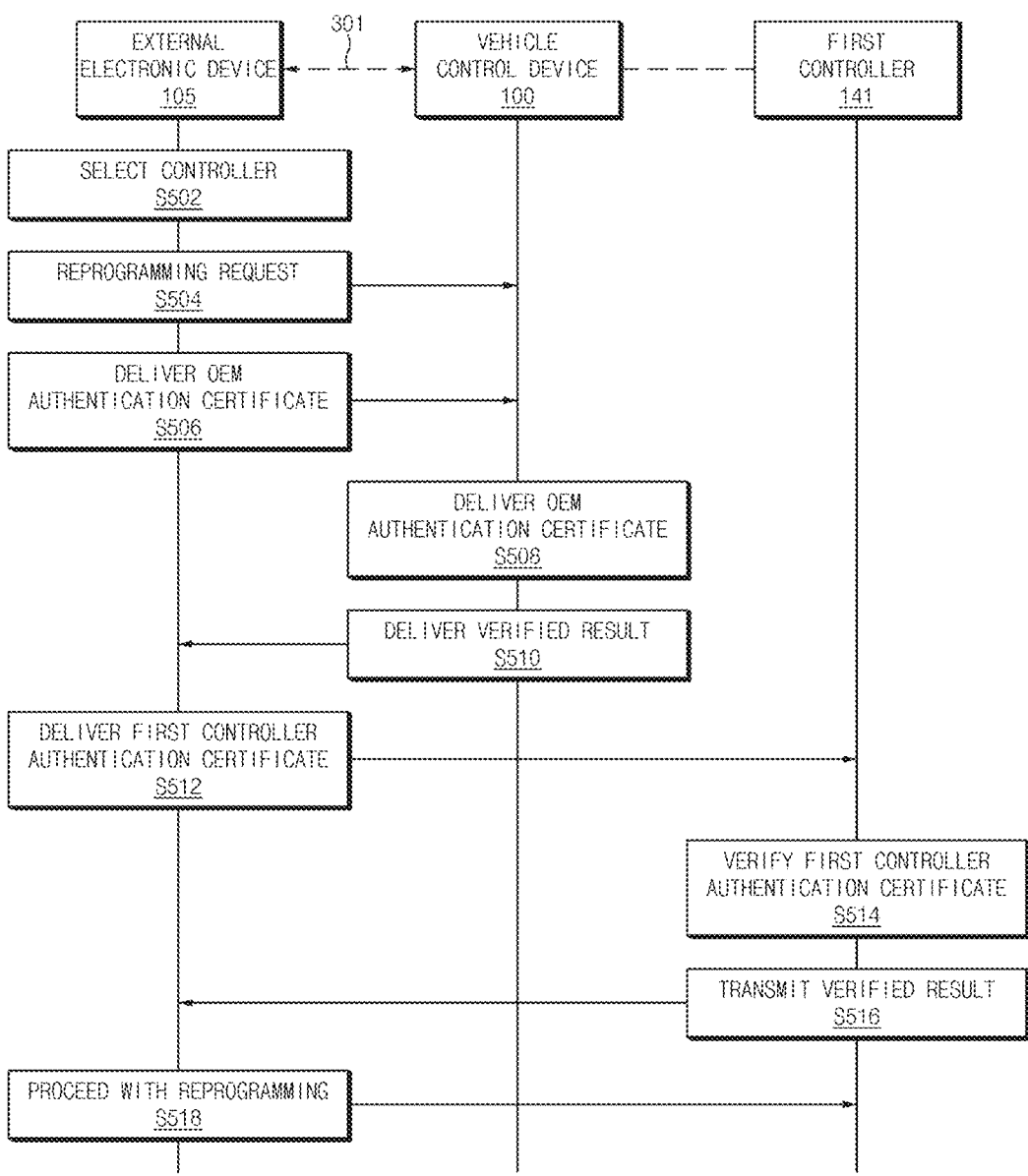
FIG. 5 illustrates an example of a signal sequence diagram about a vehicle control system according to an embodiment of the present disclosure.

FIG. 5 illustrates an example of a signal sequence diagram about a vehicle control system according to an embodiment of the present disclosure. FIG. 6 illustrates an example of performing verification for an external electronic device in a controller according to an embodiment of the present disclosure. Referring to FIG. 5, a communication link 301 between an external electronic device 105 and a vehicle control device 100 may be referred to a communication link 301 of FIG. 3. Referring to FIG. 5, the external electronic device 105, the vehicle control device 100, and/or a first controller 141 may be included in a vehicle control system 101 of FIG. 1.

Referring to FIG. 5, in an embodiment, in S502, the external electronic device 105 may receive an input indicating selecting the first controller 141. In S504, the external electronic device 105 may request the vehicle control device 100 to reprogram the selected first controller 141. In S506, the external electronic device 105 may deliver (or transmit) an OEM authentication certificate for accessing the vehicle control device 100 to the vehicle control device 100.

The vehicle control device 100 according to an embodiment may request an OEM authentication certificate for accessing the vehicle control device 100 from the external electronic device 105, based on the reprogramming request received from the external electronic device 105. Thus, the vehicle control device 100 may receive an OEM authentication certificate 410-2. Before requesting an authentication certificate (e.g., a first controller authentication certificate 610-2) corresponding to the first controller 141 from the external electronic device 105, the vehicle control device 100 according to an embodiment may receive another authentication certificate (e.g., the OEM authentication certificate 410-2) distinct to a first controller authentication certificate 610-2, together with a request for changing the first controller 141 from the external electronic device 105.

In S508, the vehicle control device 100 according to an embodiment may verify the OEM authentication certificate 410-2 received from the external electronic device 105. In S510, the vehicle control device 100 according to an embodiment may deliver the verified result to the external electronic device 105, based on the completion of the verification for the OEM authentication certificate 410-2.

The vehicle control device 100 according to an embodiment may determine whether to perform verification for the external electronic device 105 by means of the first controller 141 between the first controller 141 and the vehicle control device 100, using authentication information (e.g., authentication information 123 of FIG. 1) about the first controller 141, based on the completion of the verification. For example, the vehicle control device 100 may complete the verification for the OEM authentication certificate 410-2 and thus may grant the external electronic device 105 to transmit a first controller authentication certificate to the first controller 141. The vehicle control device 100 according to an embodiment may request a first controller authentication certificate 610 corresponding to the first controller 141 from the external electronic device 105, based on the determination to perform the verification for the external electronic device 105 by means of the first controller 141. For example, the vehicle control device 100 may set routing between the external electronic device 105 and the first controller 141, based on the completion of the verification for the first controller authentication certificate 610-2 performed by the first controller 141.

Figure 6:
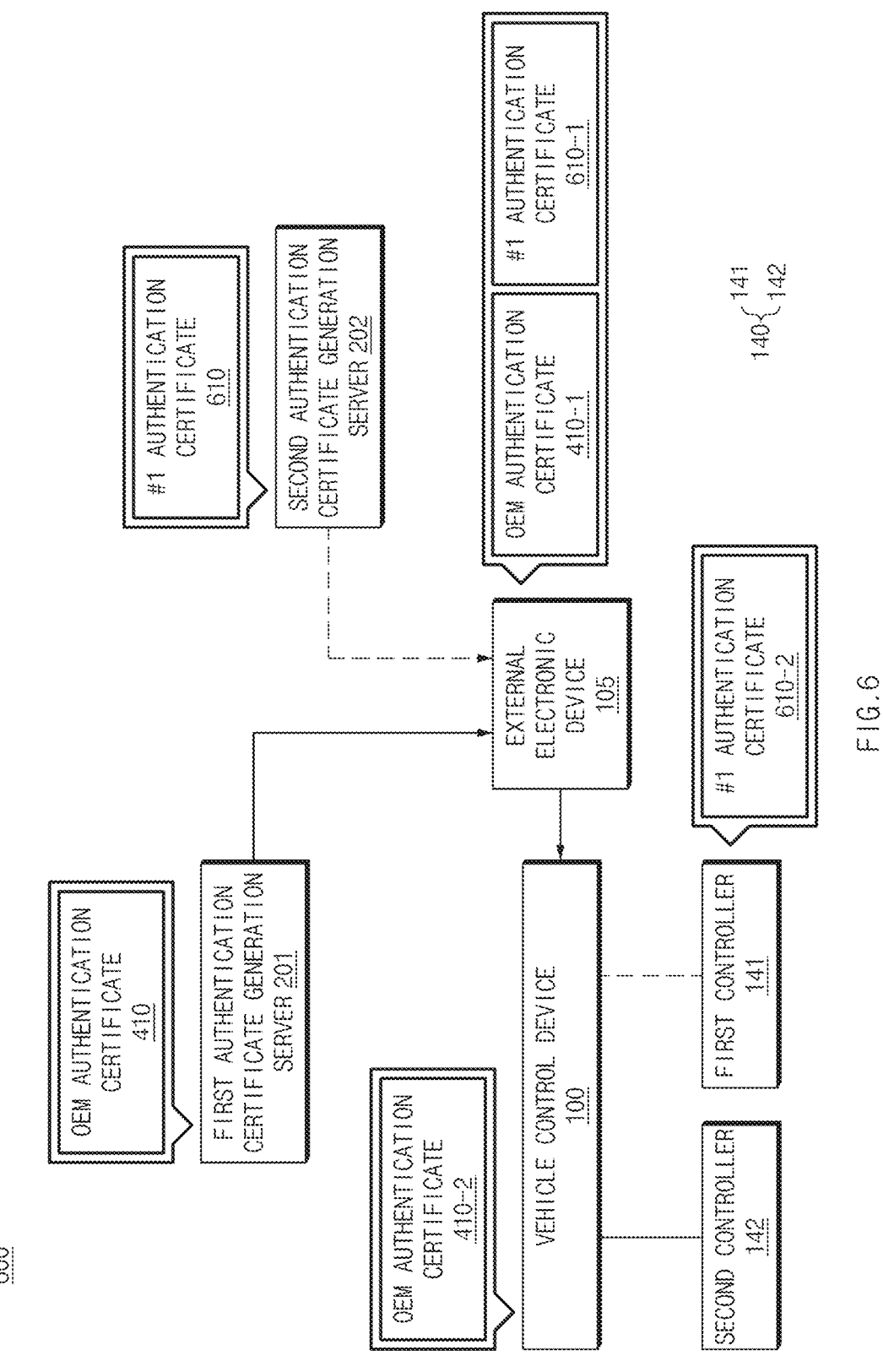
FIG. 6 illustrates an example of performing verification for an external electronic device in a controller included in a vehicle control system according to an embodiment of the present disclosure.

Referring to FIG. 6, a state 600 in which a vehicle control system (e.g., a vehicle control system 101 of FIG. 1) according to an embodiment performs verification for the external electronic device 105 by means of the first controller 141 and/or the vehicle control device 100 is illustrated.

The external electronic device 105 in the vehicle control system according to an embodiment may manage an OEM authentication certificate 410-1 and/or a first controller authentication certificate 610-1, when obtaining an OEM authentication certificate 410 generated from a first authentication certificate generation server 201 and/or a first controller authentication certificate 610 provided from a second authentication certificate generation server 202.

The external electronic device 105 in the vehicle control system according to an embodiment may provide the OEM authentication certificate 410-1 to the vehicle control device 100 and may then transmit the first controller authentication certificate 610-1 to access the first controller 141, which does not follow the OEM controller access policy.

In an embodiment, the vehicle control device 100 in the vehicle control system may verify the OEM authentication certificate 410-2 and may then request the first controller authentication certificate 610-1 corresponding to the first controller 141.

The vehicle control device 100 in the vehicle control system according to an embodiment may receive the first controller authentication certificate 610-2 corresponding to the first controller 141 from the external electronic device 105 and may transmit the first controller authentication certificate 610-2 to the first controller 141. The first controller authentication certificate 610-2 may include substantially the same information as the first controller authentication certificate 610 and/or the first controller authentication certificate 610-1. The first controller authentication certificate 610-2 may be exclusively set in the first controller 141.

The first controller 141 in the vehicle control system according to an embodiment may determine whether to grant the external electronic device 105 access authority over the first controller 141, based on the performed verification for the first controller authentication certificate 610-2 between the OEM authentication certificate 410-2 and the first controller authentication certificate 610-2.

Referring again to FIG. 5, in an embodiment, in S512, the external electronic device 105 may deliver (or transmit) the first controller authentication certificate 610-1 to the first controller 141. For example, in S514, the first controller 141 may verify the first controller authentication certificate 610-2. The first controller 141 may grant a change by the external electronic device 105, based on the result of verifying the first controller authentication certificate 610-2. The operation in which the first controller 141 verifies the first controller authentication certificate 610-2 may be substantially the same as the operation in which the vehicle control device 100 verifies the OEM authentication certificate 410-2.

Referring to FIG. 5, in an embodiment, in S516, the first controller 141 may transmit the verified result to the external electronic device 105. The first controller 141 may transmit the verified result to the external electronic device 105 through the vehicle control device 100.

The vehicle control device 100 according to an embodiment may set routing between the external electronic device 105 and the first controller 141, based on the completion of the verification for the first controller authentication certificate 610-2, which is performed by the first controller 141.

For example, in S518, the external electronic device 105 may proceed with reprogramming the first controller 141, based on the routing set by the vehicle control device 100. For example, the external electronic device 105 may transmit reprogramming information for reprogramming the first controller 141 to the vehicle control device 100.

The vehicle control device 100 according to an embodiment may receive reprogramming information for changing the first controller 141 from the external electronic device 105, based on the set routing. The vehicle control device 100 may receive reprogramming information for changing the first controller 141, which performs the verification for the first controller authentication certificate 610-2 from the external electronic device 105, based on a granted access to the first controller 141, which performs the verification for the authentication certificate 610-2.

The vehicle control device 100 according to an embodiment may transmit the reprogramming information, received from the external electronic device 105, to the first controller 141. The first controller 141 may be at least partially changed (or reprogrammed), using the reprogramming information. The external electronic device 105 may diagnose or change the first controller 141, by means of the vehicle control device 100.

Described above, the vehicle control system according to an embodiment may manage the plurality of authentication certificates provided from the one or more authentication certificate generation servers and thus may perform the verification for the external electronic device 105 in the vehicle control system, independently of a type of a controller.

Figure 7:
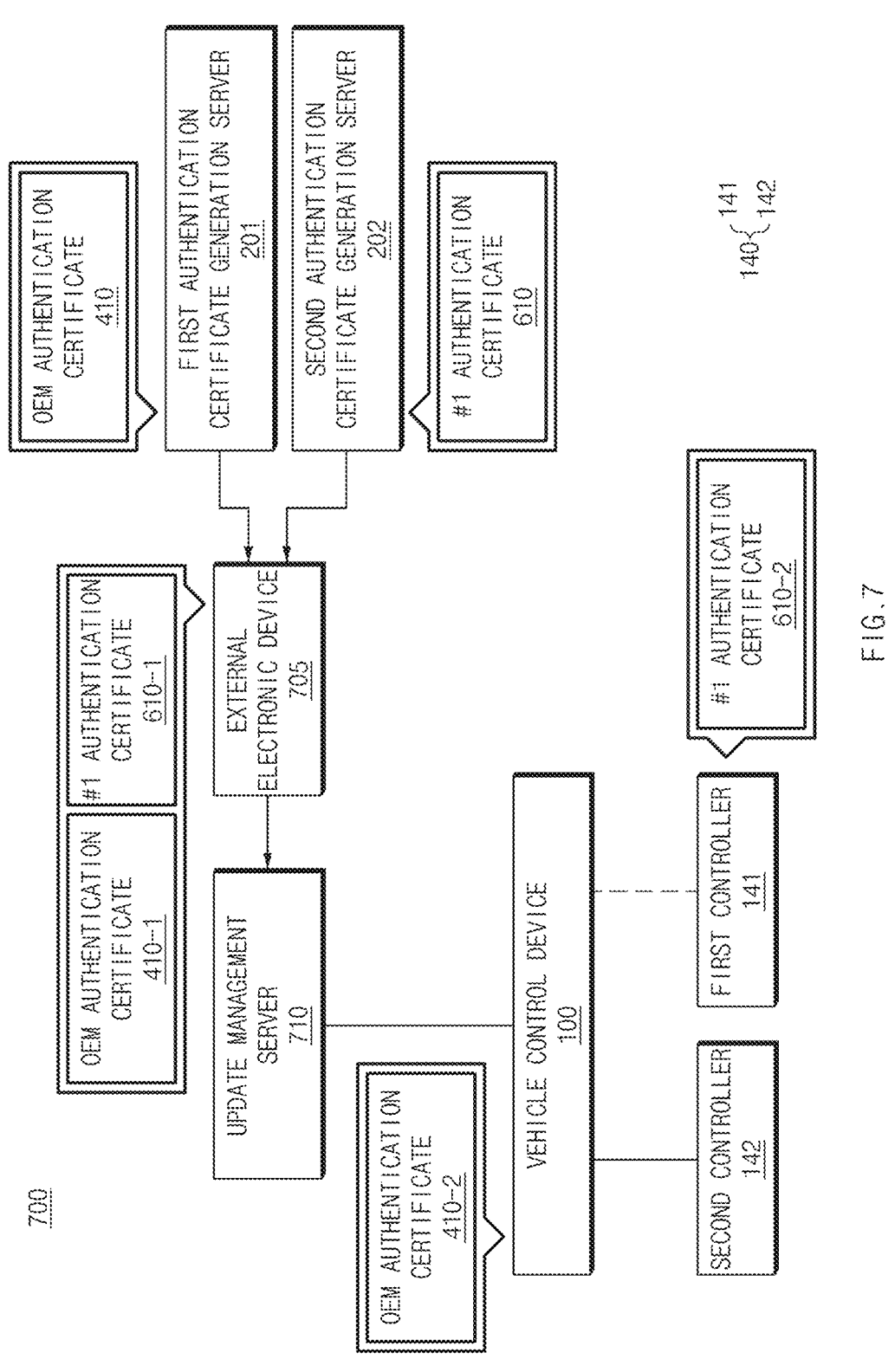
FIG. 7 illustrates an example of routing an external electronic device and a controller using an external server in a vehicle control device according to an embodiment of the present disclosure.

FIG. 7 illustrates an example of routing an external electronic device and a controller using an external server in a vehicle control device according to an embodiment of the present disclosure. Referring to FIG. 7, a state 700 of a vehicle control system according to an embodiment of the present disclosure for managing an authentication certificate using an external electronic device 705 is illustrated.

A vehicle control device 100 according to an embodiment may be indirectly connected to the external electronic device 705 through an update management server 710 for updating a controller 140 interworking with the vehicle control device 100.

For example, the update management server 710 may include a server for updating software, such as firmware, an operating system, a process, a routine, a sub-routine, and/or an application, which is associated with the vehicle control system or for reprogramming a controller. For example, the update management server 710 may be referred to as an OEM on-the-air (OTA) server.

For example, the external electronic device 705 of FIG. 7 may be referred to as an "authentication certificate management server" in terms of managing authentication certificates (e.g., an OEM authentication certificate 410-1 and a first controller authentication certificate 610-1) and being directly connected to the vehicle control device 100 through the update management server 710. For example, the external electronic device 705 may be included in an external electronic device 105 of FIG. 1. As an example, at least one of operations of an external electronic device 105 of FIGS. 3 and 5 may be performed by the external electronic device 705 of FIG. 7.

For example, the external electronic device 705 may obtain an OEM authentication certificate 410 generated from a first authentication certificate generation server 201 and/or a first controller authentication certificate 610 generated from a second authentication certificate generation server 202.

For example, the external electronic device 705 may transmit the OEM authentication certificate 410-1 and/or the first controller authentication certificate 610-1 to the vehicle control device 100 through the update management server 710 to diagnose (or change) a first controller 141.

The vehicle control device 100 according to an embodiment may perform verification for an OEM authentication certificate 410-2 received from the external electronic device 705. For example, the first controller 141 may perform verification for the first controller authentication certificate 610-2. The vehicle control device 100 may identify the completion of the verification for the OEM authentication certificate 410-2 and the completion of the verification for the first controller authentication certificate 610-2 to set routing between the external electronic device 705 and the first controller 141. The vehicle control device 100 may receive reprogramming information from the external electronic device 705 based on the set routing.

As described above, the vehicle control system according to an embodiment may obtain or manage the plurality of authentication certificates based on different types, using the external electronic device 705 indicating a non-transitory computer-readable storage medium.

Figure 8:
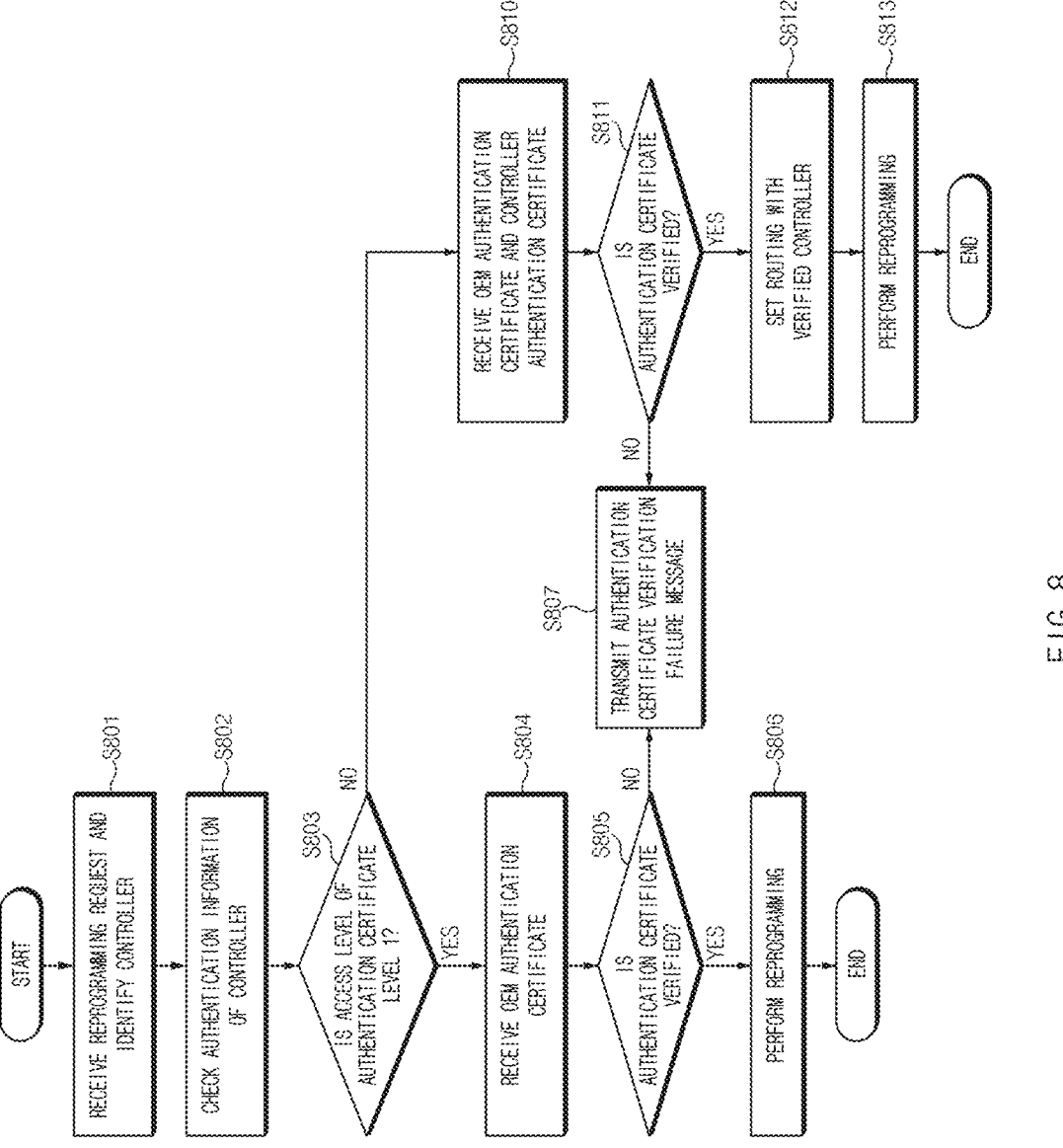
FIG. 8 illustrates an example of a flowchart about a vehicle control method according to an embodiment of the present disclosure.

FIG. 8 illustrates an example of a flowchart about a vehicle control method according to an embodiment of the present disclosure. Hereinafter, it is assumed that a vehicle control device 100 of FIG. 1 performs a process of FIG. 8. Furthermore, in a description of FIG. 8, an operation described as being performed by a device may be understood as being controlled by a processor 110 of the vehicle control device 100.

At least one of the operations of FIG. 8 may be performed by the vehicle control device 100 of FIG. 1. The respective operations of FIG. 8 may be sequentially performed but are not necessarily sequentially performed. For example, an order of the respective operations may be changed, and at least two operations may be performed in parallel. At least one of the operations of FIG. 8 may be associated with at least one of operations performed by a vehicle control device of FIGS. 3 and 5.

Referring to FIG. 8, in S801, the vehicle control method according to an embodiment may include receiving a reprogramming request from an external electronic device and identifying a controller for reprogramming.

For example, in the vehicle control method, the request for reprogramming request may include a diagnosis identifying a state of the controller.

Referring to FIG. 8, in S802, the vehicle control method according to an embodiment may include checking authentication information of the controller.

For example, the vehicle control method may include identifying an access level corresponding to the controller, using authentication information 123 of FIG. 1. The vehicle control method may also include identifying an access level (or a type of an authentication certificate) required for the external electronic device to access the controller.

Referring to FIG. 8, in S803, the vehicle control method may include identifying whether the access level of the authentication certificate is level 1. When the access level of the authentication certificate is level 1, a controller (e.g., a second controller 142 of FIG. 2) corresponding to the authentication certificate may be a controller set based on an OEM controller access policy.

Referring to FIG. 8, when the access level of the authentication certificate is level 1 (S803—YES), in S804, the vehicle control method according to an embodiment may include receiving an OEM authentication certificate (e.g., an OEM authentication certificate 410-2 of FIG. 4) from the external electronic device.

Referring FIG. 8, in S805, the vehicle control method according to an embodiment may include determining whether the OEM authentication certificate received from the external electronic device is verified.

Referring to FIG. 8, when completing the verification for the OEM authentication certificate (S805—YES), in S806, the vehicle control method according to an embodiment may include performing reprogramming by the external electronic device.

For example, the vehicle control method may include granting the external electronic device access to the vehicle control device based on the completion of the verification for the OEM authentication certificate by the vehicle control device.

For example, the vehicle control method may include receiving reprogramming information indicating reprogramming from the external electronic device to the vehicle control device, based on the external electronic device access granted to the vehicle control device.

Referring to FIG. 8, when the verification for the OEM authentication certificate fails (S805—NO), in S807, the vehicle control method according to an embodiment may include transmitting a message indicating the failure of the authentication certificate verification from the vehicle control device to the external electronic device.

Referring to FIG. 8, when the access level of the authentication certificate is not level 1 (S803—NO), in S810, the vehicle control method according to an embodiment may include receiving the OEM authentication certificate and a controller authentication certificate (e.g., a first controller authentication certificate 610-2 of FIG. 6) corresponding to a controller from the external electronic device to the vehicle control device.

For example, before receiving the OEM authentication certificate and the controller authentication certificate, the vehicle control method may include requesting, by the vehicle control device, the OEM authentication certificate and a controller authentication certificate (e.g., a first controller authentication certificate 610 of FIG. 6) from the external electronic device.

For example, the vehicle control method may include performing verification controller authentication certificate by means of the controller, after performing the verification for the OEM authentication certificate by means of the vehicle control device.

Referring FIG. 8, in S811, the vehicle control method according to an embodiment may include determining whether the OEM authentication certificate by means of the vehicle control device is verified and whether the controller authentication certificate is verified by means of the controller. For example, the performing of the verification for the OEM authentication certificate and/or the controller authentication certificate may include performing verification for the external electronic device, which provides the OEM authentication certificate and the controller authentication certificate.

Referring to FIG. 8, when the verification for the OEM authentication certificate or the verification for the controller authentication certificate fail (S811—NO), in S807, the vehicle control method according to an embodiment may include transmitting a message indicating the failure of the authentication certificate verification from the vehicle control device to the external electronic device.

For example, when the verification for the controller authentication certificate fails, the vehicle control method may include transmitting, by the controller, which performs the verification for the controller authentication certificate, a message indicating the failure of authentication certificate verification to the external electronic device through the vehicle control device.

Referring to FIG. 8, when the verification for the OEM authentication certificate and the verification for the controller authentication certificate by means of the controller are completed (S811—YES), in S812, the vehicle control method according to an embodiment may include setting routing between the controller and the external electronic device.

Referring FIG. 8, in S813, the vehicle control method according to an embodiment may include performing, by the external electronic device, reprogramming for the controller, based on the set routing.

For example, the performing of the reprogramming may include performing a diagnosis for the controller. The performing of the diagnosis for the controller may include identifying a state of the controller. However, it is not limited thereto.

As described above, the vehicle control method according to an embodiment may include determining an entity, which performs an operation of verifying an authentication certificate provided from the external electronic device, based on a type of the authentication certificate.

Figure 9:
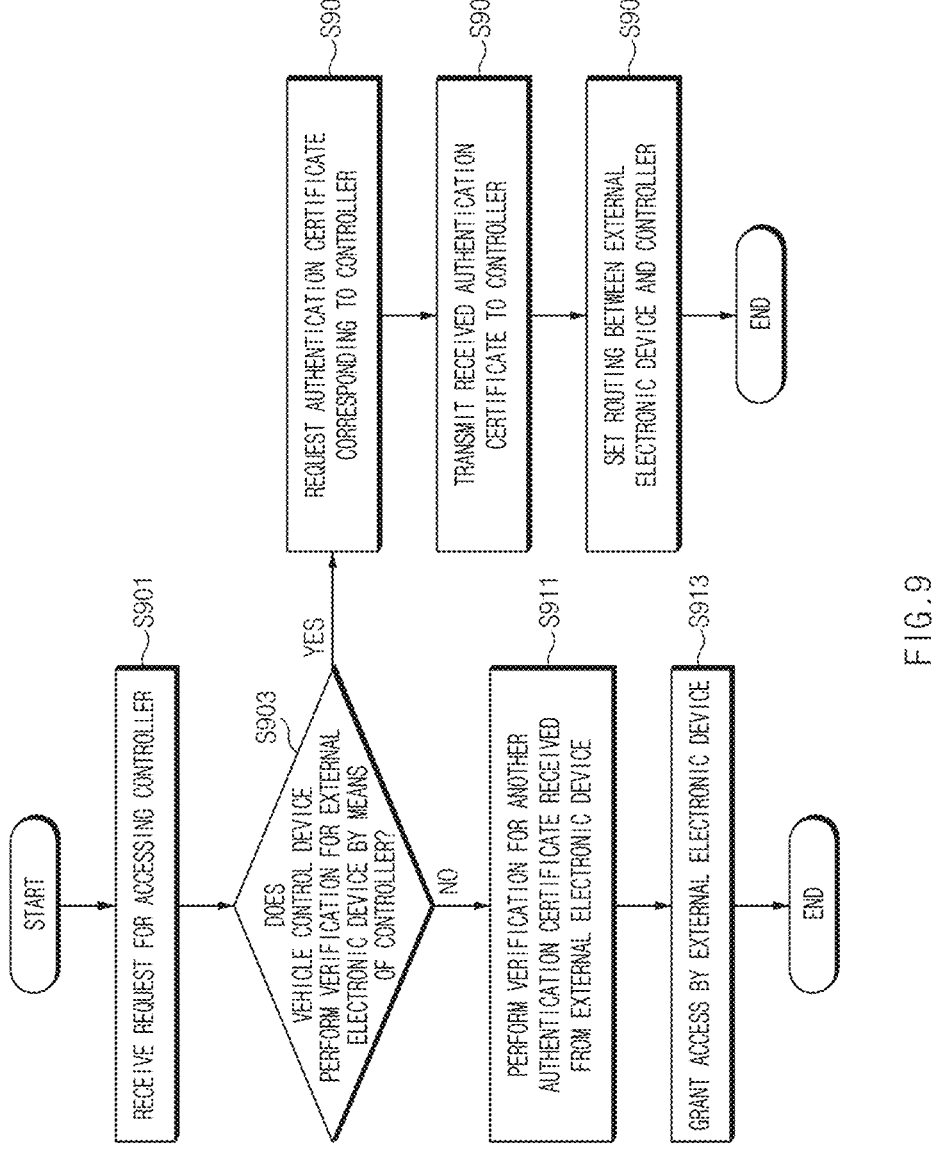
FIG. 9 illustrates an example of a flowchart illustrating an operation of granting access of an external electronic device in a vehicle control device according to an embodiment of the present disclosure.

FIG. 9 illustrates an example of a flowchart illustrating an operation of granting access of an external electronic device in a vehicle control device according to an embodiment of the present disclosure. The respective operations of FIG. 9 may be sequentially performed, but are not necessarily sequentially performed. For example, an order of the respective operations may be changed, and at least two operations may be performed in parallel. At least one of the operations of FIG. 9 may be associated with at least one of operations performed by a vehicle control device of FIGS. 3 and 5.

Referring FIG. 9, in S901, the vehicle control method according to an embodiment may include receiving a request for accessing a controller from an external electronic device to a vehicle control device.

Referring FIG. 9, in S903, the vehicle control method according to an embodiment may include determining whether the vehicle control device performs verification for the external electronic device by means of the controller.

Referring to FIG. 9, based on the determination to perform the verification for the external electronic device by means of the controller (S903—YES), in S905, the vehicle control method according to an embodiment may include requesting an authentication certificate corresponding to the controller.

For example, before requesting the authentication certificate corresponding to the controller from the external electronic device, the vehicle control method may include receiving another authentication certificate distinct to the authentication certificate together with a request for changing the controller from the external electronic device. The other authentication certificate may include an OEM authentication certificate.

For example, the vehicle control method may include performing verification for the other authentication certificate by means of the vehicle control device.

For example, the vehicle control method may include granting access by the external electronic device, based on the completion of the verification for the other authentication certificate.

Referring FIG. 9, in S907, the vehicle control method according to an embodiment may include transmitting, by the vehicle control device, the authentication certificate, received from the external electronic device, to the controller.

Referring to FIG. 9, in S909, the vehicle control method according to an embodiment may include setting routing between the external electronic device and the controller, which performs the verification, based on the completion of the verification for the external electronic device (or the authentication certificate), which is performed by the controller.

For example, the vehicle control method may include reprogramming the controller, based on the set routing between the external electronic device and the controller.

Referring to FIG. 9, based on another determination distinct to the determination to perform the verification for the external electronic device by means of the controller (S903—NO), in S911, the vehicle control method according to an embodiment may include performing verification for the other authentication certificate received from the external electronic device.

Referring FIG. 9, in S913, the vehicle control method according to an embodiment may include granting access by the external electronic device, based on the completion of the verification for the other authentication certificate. For example, as the access by the external electronic device is granted, the external electronic device is granted access to a controller following an OEM controller access policy among controllers which are at least partially connected to the vehicle control device.

Figure 10:
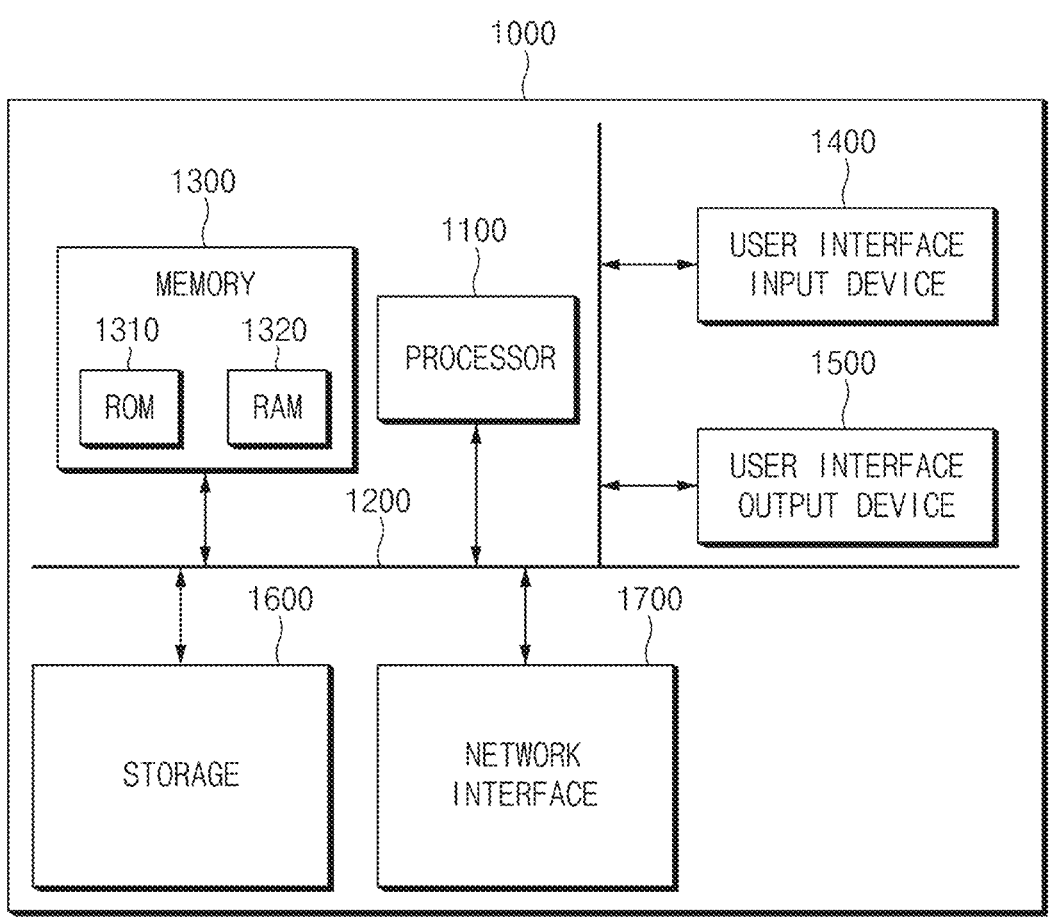
FIG. 10 illustrates a computing system associated with a vehicle control device or a vehicle control method according to an embodiment of the present disclosure.

FIG. 10 illustrates a computing system associated with a vehicle control device or a vehicle control method according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) (1310) and a random access memory (RAM) (1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

The present technology may determine hardware to perform verification for a diagnostic.

Furthermore, the present technology may identify whether a controller follows an OEM controller access policy, using authentication information corresponding to the controller.

Furthermore, the present technology may comprehensively manage an OEM authentication certificate for accessing a controller following the OEM controller access policy and a controller authentication certificate for accessing another controller, which does not follow the OEM controller access policy.

In addition, various effects ascertained directly or indirectly through the present disclosure may be provided.

Therefore, the embodiments of the present disclosure are provided to explain the spirit and scope of the present disclosure but are not intended to limit the spirit and scope of the present disclosure. Thus, the spirit and scope of the present disclosure is not limited by the embodiments. The scope of protection of the present disclosure should be construed by the attached claims, and all equivalents thereof should be construed as being included within the scope of the present disclosure.

Hereinabove, although the present disclosure has been described with reference to embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

What is claimed is:

1. A vehicle control device, comprising:
   a processor; and
   a memory configured to store instructions,
   wherein the processor, by executing the instructions, is configured, to
      receive a request for accessing a controller and reprogramming the controller from an external electronic device configured to access the controller through the vehicle control device,
      determine, based on the received request and using authentication information about the controller, whether verification of the external electronic device is to be performed by the controller or by the vehicle control device, and
      based on determination to perform the verification for the external electronic device by means of the controller
         request a first authentication certificate corresponding to the controller from the external electronic device,
         transmit the first authentication certificate, received from the external electronic device, to the controller in response to requesting the first authentication certificate, and
         set routing between the external electronic device and the controller, based on completion of verification for the first authentication certificate, the verification being performed by the controller.

2. The vehicle control device of claim 1, wherein the processor, by executing the instructions, is further configured to:

receive a second authentication certificate distinct to the first authentication certificate, together with a request for changing the controller, from the external electronic device, before requesting the first authentication certificate corresponding to the controller from the external electronic device;

perform verification for the received second authentication certificate; and grant an access by the external electronic device, based on completion of the verification for the second authentication certificate.

3. The vehicle control device of claim 2, wherein the processor, by executing the instructions, is further configured to:

set routing between the external electronic device and the controller, based on the completion of the verification for the second authentication certificate, without the verification for the first authentication certificate, based on another determination distinct to the determination to perform the verification for the external electronic device by means of the controller.

4. The vehicle control device of claim 2, wherein the processor, by executing the instructions, is further configured to:

transmit a result of performing the verification for the second authentication certificate to the external electronic device.

5. The vehicle control device of claim 2, further comprising:

a communication circuit, wherein the processor, by executing the instructions, is further configured to establish a communication link with the external electronic device in a wireless or wired manner through the communication circuit, and receive the first authentication certificate or the second authentication certificate from the external electronic device through the communication link, based on the request for accessing the controller received from the external electronic device through the established communication link.

6. The vehicle control device of claim 1, wherein the first authentication certificate is exclusively set in the controller.

7. The vehicle control device of claim 1, wherein the processor, by executing the instructions, is further configured to:

receive reprogramming information for changing the controller from the external electronic device, based on the set routing between the external electronic device and the controller.

8. The vehicle control device of claim 1, wherein the authentication information includes information about an authentication certificate type classified according to whether to grant the external electronic device access authority over the controller using the controller.

9. A vehicle control system, comprising:

a controller;

a gateway including authentication information indicating a type of a first authentication certificate for accessing the controller; and an external electronic device, wherein the gateway is configured to receive a request for accessing a controller at least partially connected to the gateway from the external electronic device, request a second authentication certificate distinct to the first authentication certificate and for accessing the gateway from the external electronic device, based on the received request, perform verification for the second authentication certificate received from the external electronic device, determine, based on completion of the verification for the second authentication certificate and using authentication information about the controller, whether verification for the external electronic device is to be performed by the controller or by a vehicle control device, request the first authentication certificate corresponding to the controller from the external electronic device, based on determination to perform the verification for the external electronic device by means of the controller, and set routing between the external electronic device and the controller, based on completion of verification for the first authentication certificate, the verification being performed by the controller, wherein the controller is configured to perform the verification for the first authentication certificate received from the external electronic device, and grant a change by the external electronic device, based on a result of verifying the first authentication certificate, and wherein the external electronic device is configured to diagnose or change the controller by means of the gateway.

10. The vehicle control system of claim 9, wherein the gateway is further configured to:

perform the verification for the second authentication certificate and grant the external electronic device access to the controller, based on another determination distinct to the determination to perform the verification for the external electronic device by means of the controller.

11. The vehicle control system of claim 10, wherein the controller is further configured to:

determine whether to grant the external electronic device access authority over the controller, based on the performed verification for the first authentication certificate between the first authentication certificate and the second authentication certificate.

12. The vehicle control system of claim 11, wherein the gateway is further configured to:

receive reprogramming information for changing the controller, which performs the verification for the first authentication certificate, from the external electronic device, based on the granted access to the controller, which performs the verification for the first authentication certificate.

13. The vehicle control system of claim 12, wherein the external electronic device is further configured to:

manage the first authentication certificate and the second authentication certificate, based on the first authentication certificate or the second authentication certificate obtained from an external server distinct to the external electronic device.

14. A vehicle control method, comprising:

receiving a request for accessing a controller and reprogramming the controller from an external electronic device configured to access the controller through a vehicle control device;

determining, based on the received request and using authentication information about the controller, whether verification for the external electronic device is to be performed by the controller or by the vehicle control device; and based on determination to perform the verification for the external electronic device by means of the controller requesting a first authentication certificate corresponding to the controller from the external electronic device, transmitting the first authentication certificate, received from the external electronic device, to the controller in response to requesting the first authentication certificate, and setting routing between the external electronic device and the controller, based on completion of verification for the first authentication certificate, the verification being performed by the controller.

15. The vehicle control method of claim 14, wherein receiving the request for accessing the controller comprises:

receiving a second authentication certificate distinct to the first authentication certificate, together with a request for changing the controller, from the external electronic device, before requesting the first authentication certificate corresponding to the controller from the external electronic device;

performing verification for the received second authentication certificate; and granting access by the external electronic device, based on completion of the verification for the second authentication certificate.

16. The vehicle control method of claim 15, wherein determining whether to perform the verification includes:

setting the routing between the external electronic device and the controller, based on completion of the verification for the second authentication certificate, without the verification for the first authentication certificate, based on another determination distinct to the determination to perform the verification for the external electronic device by means of the controller.

17. The vehicle control method of claim 15, wherein performing the verification for the received second authentication certificate comprises:

transmitting the result of performing the verification for the second authentication certificate to the external electronic device.

18. The vehicle control method of claim 15, wherein receiving the request for accessing the controller comprises:

establishing a communication link with the external electronic device in a wireless or wired manner through a communication circuit; and receiving the first authentication certificate or the second authentication certificate from the external electronic device through the communication link, based on the request for accessing the controller received from the external electronic device through the established communication link.

19. The vehicle control method of claim 14, wherein the first authentication certificate is exclusively set in the controller.

20. The vehicle control method of claim 14, wherein setting the routing between the external electronic device and the controller comprises:

receiving reprogramming information for changing the controller from the external electronic device, based on the set routing between the external electronic device and the controller.

* * * * *